(12) United States Patent
Fischer et al.

(10) Patent No.: US 7,380,885 B2
(45) Date of Patent: Jun. 3, 2008

(54) MOTOR VEHICLE SEAT

(75) Inventors: Matthias Fischer, Kronach (DE);
Jochen Hofmann, Marktgraitz (DE)

(73) Assignee: **Brose Fahrzeugteile GmbH & Co.
KG, Coburg**, Coburg (DE)

( * ) Notice: Subject to any disclaimer, the term of this patent is extended or adjusted under 35 U.S.C. 154(b) by 52 days.

(21) Appl. No.: 10/567,769

(22) PCT Filed: Jul. 16, 2004

(86) PCT No.: PCT/DE2004/001570

§ 371 (c)(1),
(2), (4) Date: Feb. 10, 2006

(87) PCT Pub. No.: WO2005/014331

PCT Pub. Date: Feb. 17, 2005

(65) Prior Publication Data

US 2006/0261658 A1 Nov. 23, 2006

(30) Foreign Application Priority Data

Aug. 11, 2003 (DE) ................................ 103 37 682

(51) Int. Cl.
*B60N 2/02* (2006.01)
(52) U.S. Cl. .................. 297/378.12; 297/362
(58) Field of Classification Search .......... 297/378.12, 297/378.14, 362, 363
See application file for complete search history.

(56) References Cited

U.S. PATENT DOCUMENTS 3,788,698 A * 1/1974 Perkins ........................ 297/373

| | | | | |
|---|---|---|---|---|
| 4,103,964 A | * | 8/1978 | Klingelhofer et al. | ...... 297/367 |
| 4,659,146 A | * | 4/1987 | Janiaud | ...................... 297/367 |
| 4,726,622 A | | 2/1988 | Palvölgyi | |
| 5,516,198 A | * | 5/1996 | Yokoyama | .................. 297/362 |

(Continued)

FOREIGN PATENT DOCUMENTS

DE 101 09 822 A1 9/2001

(Continued)

OTHER PUBLICATIONS

English Translation of the International Preliminary Examination Report, dated Jul. 3, 2006, for corresponding PCT application PCT/DE2004/001570.

(Continued)

*Primary Examiner*—Sarah B. McPartlin
(74) *Attorney, Agent, or Firm*—Christie, Parker & Hale, LLP

(57) ABSTRACT

A motor vehicle seat includes a pivotally mounted backrest such that the inclination of the backrest can be adjusted. The backrest has a front face that supports the back of a seat occupant. The seat has a spring assembly including at least one elastic element, which elastically pretensions the backrest to bias the backrest pivotally forwards such that the front face of the backrest can come to rest against the back of the seat occupant. The inclination of the backrest is adjustable by the exertion of force on its front face in opposition to the a force of the spring assembly. The spring assembly exerts a force on a gear element that is coupled to the backrest. A locking device is allocated to gear element, permitting the backrest to be locked in different positions.

34 Claims, 13 Drawing Sheets

U.S. PATENT DOCUMENTS

| | | | |
|---|---|---|---|
| 5,547,254 A * | 8/1996 | Hoshihara | 297/367 |
| 5,718,483 A * | 2/1998 | Yamaguchi et al. | 297/367 |
| 5,733,008 A * | 3/1998 | Tame | 297/378.11 |
| 5,997,090 A | 12/1999 | Baloche et al. | |
| 6,145,930 A * | 11/2000 | Su | 297/367 |
| 6,659,557 B2 * | 12/2003 | Deptolla | 297/367 |
| 6,685,270 B2 * | 2/2004 | Haglund | 297/367 |
| 7,086,697 B2 * | 8/2006 | Tame | 297/367 |
| 2001/0030456 A1 | 10/2001 | Biletskiy | |
| 2004/0113478 A1 * | 6/2004 | Tame | 297/378.12 |
| 2006/0273645 A1 * | 12/2006 | Ferrari et al. | 297/336 |

FOREIGN PATENT DOCUMENTS

| EP | 0 404 628 A1 | 12/1990 |
|---|---|---|
| FR | 2 781 435 A1 | 1/2000 |

OTHER PUBLICATIONS

International Search Report dated Feb. 22, 2005, corresponding to PCT/DE2004/001570.

* cited by examiner

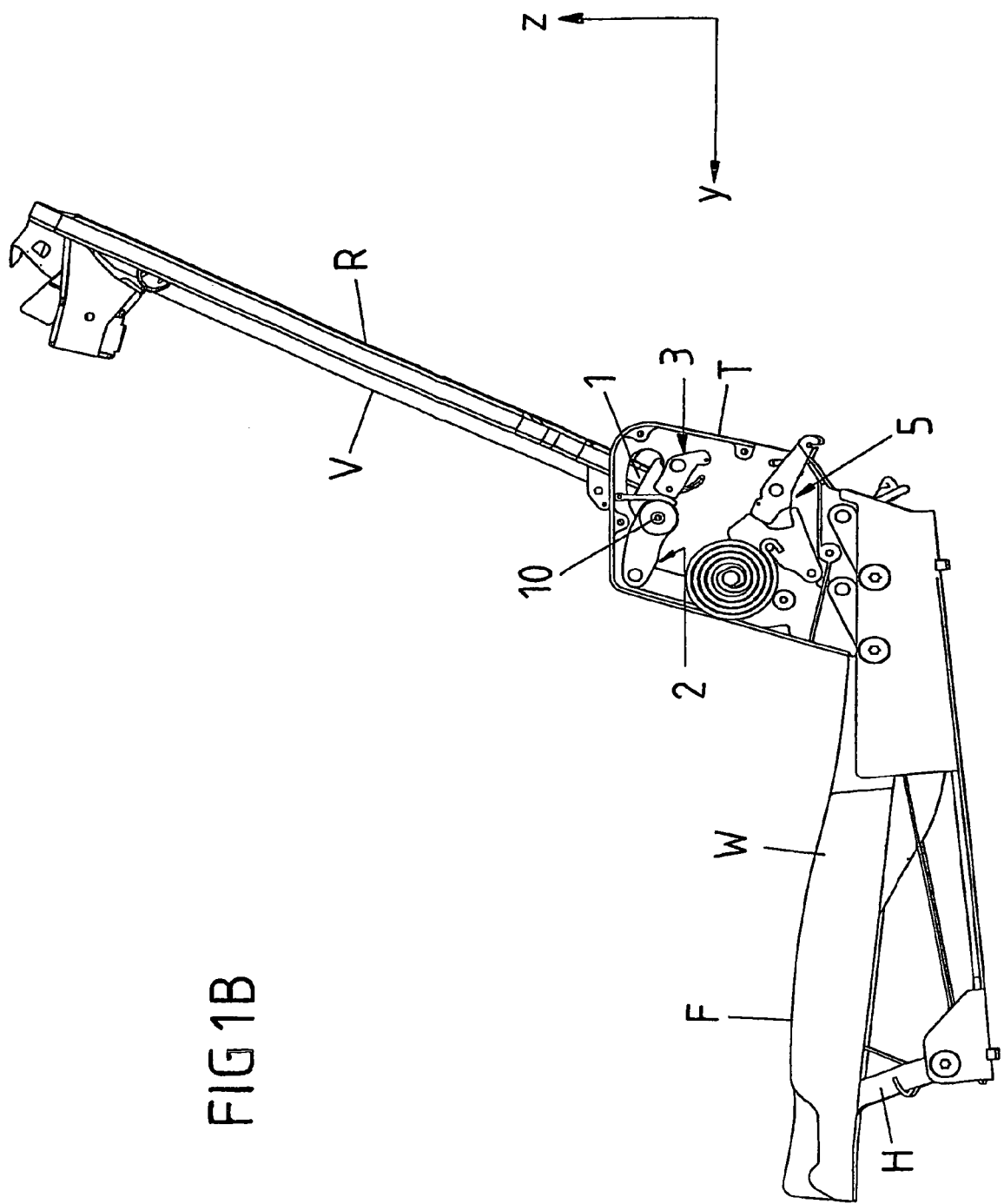

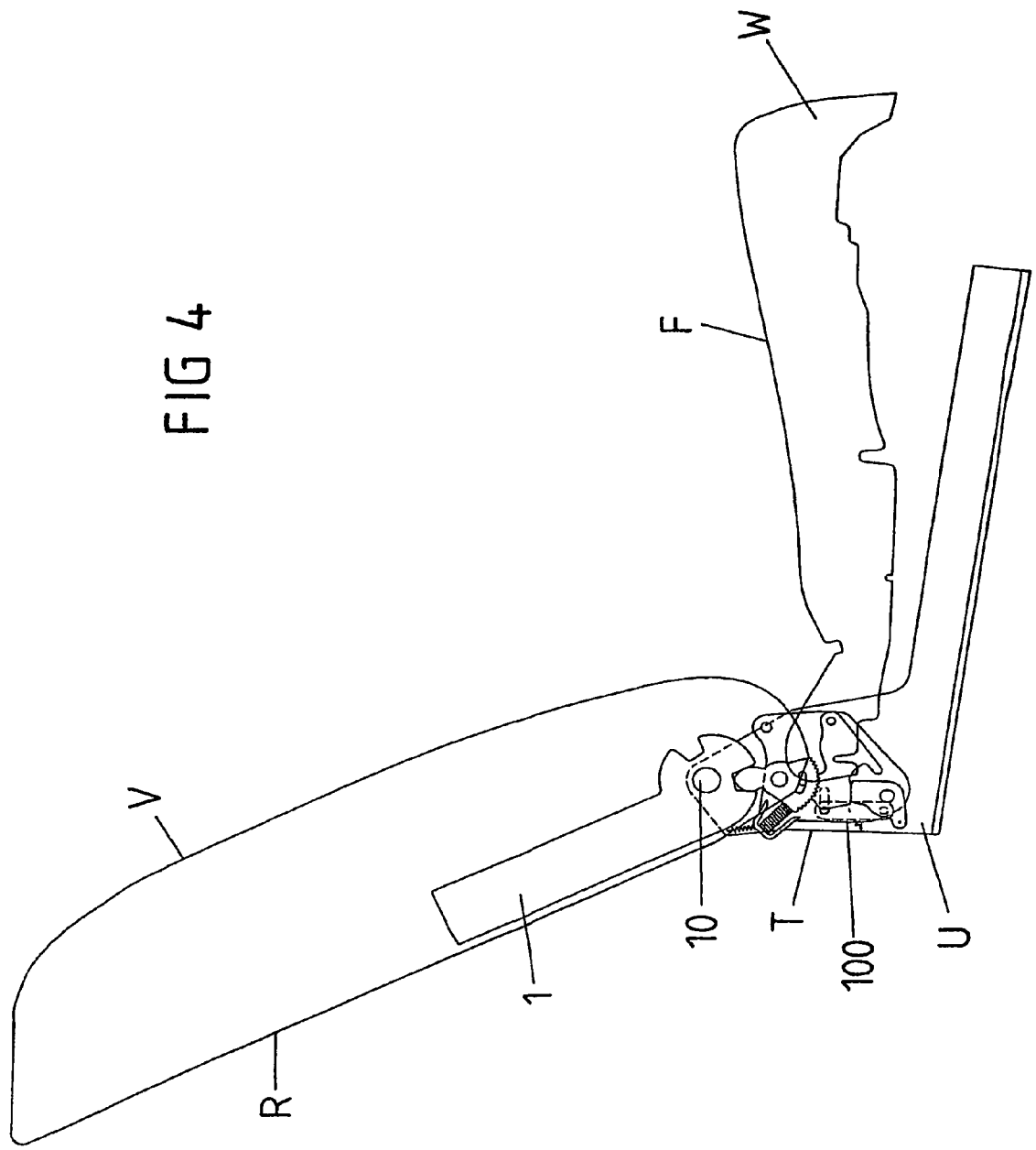

MOTOR VEHICLE SEAT

CROSS-REFERENCE TO A RELATED APPLICATION

This application is a National Phase Patent Application of International Application Number PCT/DE2004/001570, filed on Jul. 16, 2004, which claims priority of German Patent Application Number 103 37 682.8, filed on Aug. 11, 2003.

BACKGROUND

The invention relates to a motor vehicle seat.

A motor vehicle seat of this kind comprises a pivotally mounted backrest which can be adjusted in its incline and which has a front face serving to support the back of a seat user, as well as a spring assembly having at least one elastic element with which the backrest is elastically pre-stressed so that it has a tendency to incline forwards and bear with its front face against the back of the seat user. The incline of this backrest can be adjusted by exerting force on the front face of the backrest against the action of the spring assembly. That is, when the incline adjustment is in the unlocked state the backrest automatically occupies under the action of the spring assembly its most forward useful position in which it serves to support the back of a vehicle occupant, and can pivot under the action of a compressive force, applied for example through the back of the seat user, into a more marked rearwardly inclined useful position where it can be locked in this position by a locking device.

The object of the invention is to further improve a motor vehicle seat of the type mentioned at the beginning.

BRIEF DESCRIPTION

According to this the spring assembly engages on a gear element which is in active connection with the backrest and which is assigned a locking device with which the gear element can be locked in a number of different positions.

The solution according to the invention is based on the technology principle of not allowing the spring element, which is used to pretension the backrest towards a forwardly inclined position, to engage on the backrest itself but rather on a gear element which is connected to the backrest either directly or indirectly through further parts of a gear assembly. This enables on the one hand a translation of the torque acting on the gear element through the pretensioning force of the spring assembly so that the torque acting on the backrest itself which has the tendency to pivot the backrest forwards can be purposefully set by selecting the transmission ratio.

One important advantage is moreover that the indirect action of the spring assembly on the backrest (via at least one gear element) does not affect folding the backrest onto the seat surface which is normally possible and subsequently folding the backrest back into the useful position through the action of the spring element. More particularly when folding the backrest from its position folded forward onto the seat surface back into an upright useful position (which may be slightly inclined relative to the vertical) it is not necessary to overcome the pretensioning force of the spring assembly. Folding the backrest forwards can on the one hand be undertaken in order to provide additional cargo space in the area of the corresponding vehicle seat, or on the other hand to release a so-called easy-entry mechanism which in the case of a two-door motor vehicle is to facilitate entry into one of the rear seats whereby the vehicle seat with the backrest folded forwards can be moved in the seat longitudinal direction into a forward position.

The gear element on which the spring assembly engages is thereby preferably in active connection with the backrest so that in the locked state of the locking device assigned to the gear element the backrest is also locked at the same time in its relevant pivotal position (inclined relative to the vertical) and that in the unlocked state of the locking device the inclination of the backrest is adjustable, namely either forwards through the action of the spring assembly or backwards against the action of the spring assembly.

The gear element can thereby form a constituent part of a gearing assembly, more particularly a lever assembly through which the spring assembly is in active connection with the backrest. Through a corresponding design of the gearing assembly it is possible to set a desired transmission ratio for the transfer of the torque, which is exerted by the spring assembly on the gearing element, to the backrest.

In a particularly preferred further development of the invention the at least one gear element is assigned a clutch by which the backrest can be decoupled from the gear element so that the backrest can be folded forwards towards the seat surface of the motor vehicle seat without the gearing element being moved. This means on the one hand that the backrest is coupled in the event of a suitable actuation of the clutch by the spring assembly engaging on the gear element, so that as the backrest is folded forward onto the seat surface and subsequently back into a useful position the spring element does not act on the backrest.

Uncoupling the backrest from the gear element is possible according to one variation of the invention in that the pivotal axis of the backrest as the backrest folds forwards onto the seat surface (and likewise later when folding back into a useful position) is guided along a path predetermined by a guide device for the pivotal axis, which is selected so that an otherwise possible reaction of the pivotal movement of the backrest on the gear element is compensated (lifted) through the movement of the pivotal axis along the path.

According to another variation of the invention the gear element during actuation of the clutch device is brought completely out of engagement with the backrest so that the gear element is in connection with the backrest neither directly nor indirectly (through further components). This variation of the invention can be effected by way of example in that the gear element (and where applicable further elements of the gearing assembly through which the gear element is connected to the backrest) are mounted on a base plate which is movable, more particularly pivotal about an axis, so that the gear element moves out of engagement with the backrest. The base plate is thereby preferably pretensioned elastically towards the state where the gear element is in connection with the backrest, and has to be moved (pivoted) against this pretension in order to bring the gear element and backrest out of engagement.

In order to move, i.e. in particular to pivot the base plate there is an adjusting element interacting with the base plate in the form of an adjusting lever which is guided in an oblong hole of the base plate.

In a further development of the invention there are furthermore locking means with which the clutch can be locked both in the state where the gear element is coupled to the backrest, and in the state where the gear element is uncoupled from the backrest.

With the first mentioned variation of the invention the locking means are preferably formed through a pivotally mounted locking lever which in the locked state engages on the pivotal axis and blocks its movement along the path defined by the guide device.

In the second variation of the invention the locking means are preferably formed through the adjusting element previously described in the form of an adjusting lever which also serves to move (pivot) the base plate and is preferably pretensioned by an elastic element in the direction of the locked state.

The locking device assigned to the gear element can in known way be formed by a so-called primary locking element which in the locked state blocks a movement of the gear element, as well as through a secondary locking element which in turn blocks the primary locking element in the locked position and in order to unlock the locking device has to be actuated against a pretensioning force or another force acting in the direction of the locked state.

The gear element on which the spring assembly assigned to the backrest acts according to the invention is in a preferred embodiment of the invention formed by a toothed segment lever whose teeth can be brought into engagement with an associated toothing of the primary locking element.

BRIEF DESCRIPTION OF THE DRAWINGS

Further features and advantages of the invention will be apparent during the following description of embodiments with reference to the figures.

FIG. 1b is a side view of a motor vehicle seat with a backrest with variable pivotal axis which can be adjusted in incline and additionally can be folded forwards onto the seat surface;

FIG. 4 is a second embodiment of a motor vehicle seat with a backrest which can be adjusted in its inclination as well as folded forwards onto the seat surface and which has a locally invariable rotational axis;

DETAILED DESCRIPTION

Figure 1A:
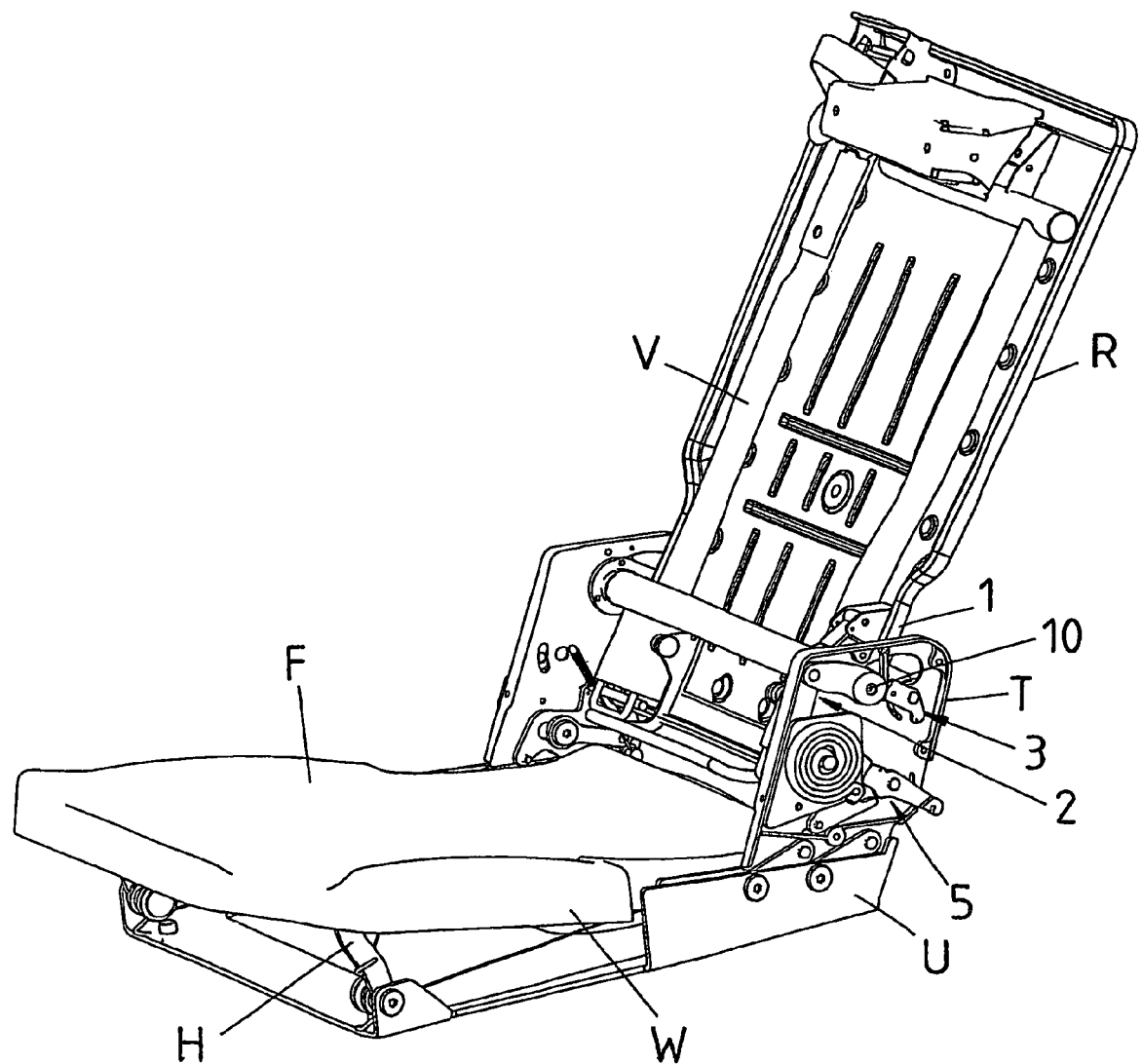
FIG. 1a is a perspective view of a motor vehicle seat with a backrest with variable pivotal axis which can be adjusted in incline and additionally can be folded forwards onto the seat surface.

FIGS. 1a and 1b show a motor vehicle seat which comprises a seat under frame U which on one side supports a seat pan B which defines a seat surface F for a seat user and which can be adjusted in height and incline by an adjusting device H, and which on the other side is fitted with a support plate T to which a backrest R is pivotally connected which has a front face V serving to support the back of a seat user. The actual seat surface of the motor vehicle seat is thereby not formed by the seat pan W but rather by a seat cushion to be mounted on the seat pan. The relevant height and incline adjustment of the seat pan W thereby defines the position of the seat surface F. In a corresponding way a backrest cushion is to be mounted on the front face V of the backrest R so that the seat user can lean with his back against this.

The motor vehicle seat illustrated in FIG. 1a can on the one hand be adjusted in its inclination relative to the vertical vehicle axis z so that the backrest R can occupy a number of different useful positions in which it serves each time to support the back of a seat user, but has each time a different inclination relative to a predetermined vertical (by way of example the vertical vehicle axis z where a seat is installed in a motor vehicle). Furthermore the backrest R can be folded forwards onto the seat surface F of the vehicle seat so that additional cargo space is made available above the backrest R or the seat can be moved forwards in the vehicle longitudinal direction x within the scope of a so-called easy entry function.

Figure 2:
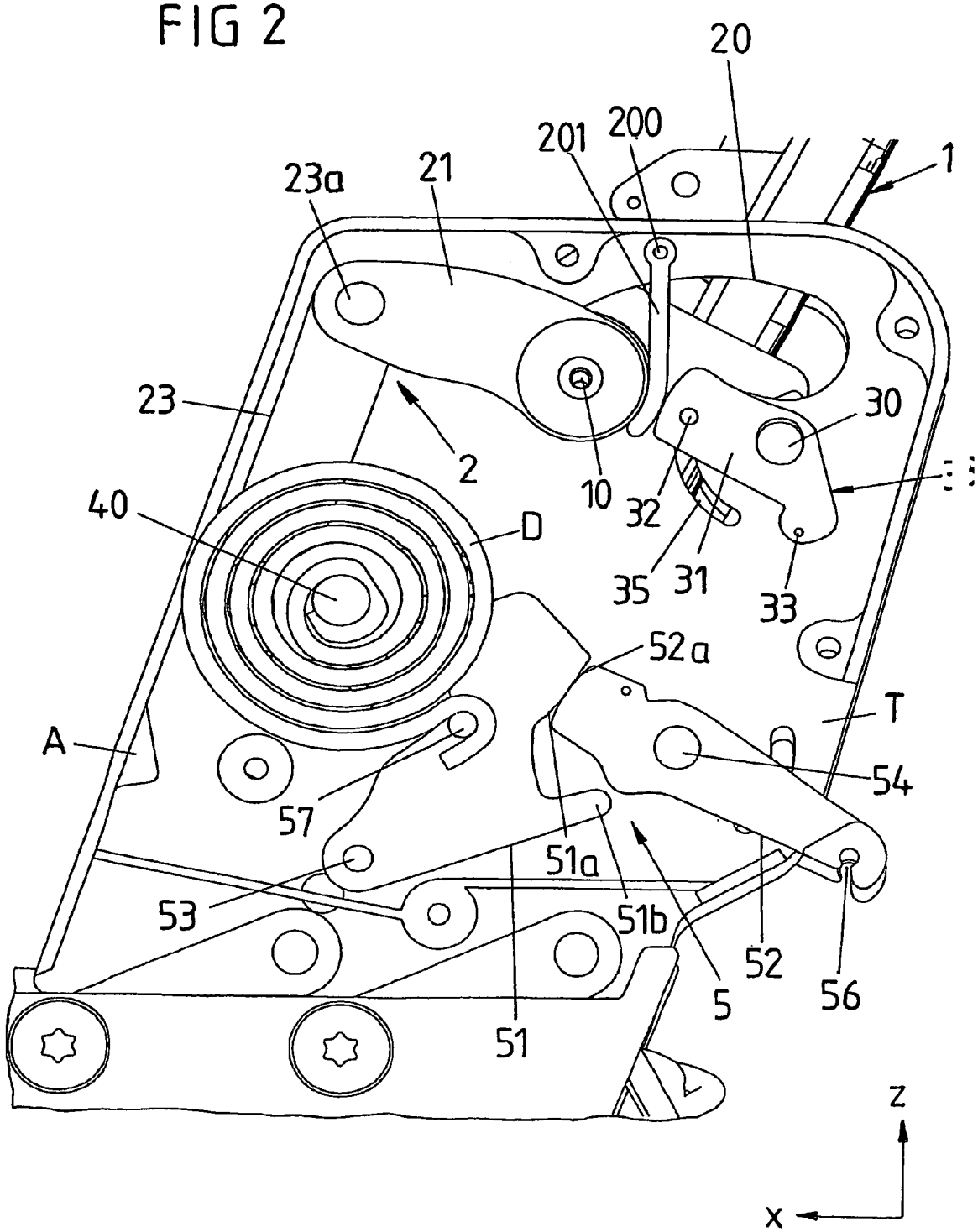
FIG. 2 is a detailed view of the motor vehicle seat of FIGS. 1a and 1b in the region of the connection of the backrest to the underframe of the seat to show the means which enable the incline to be adjusted and the backrest to fold forwards.
Figure 3:
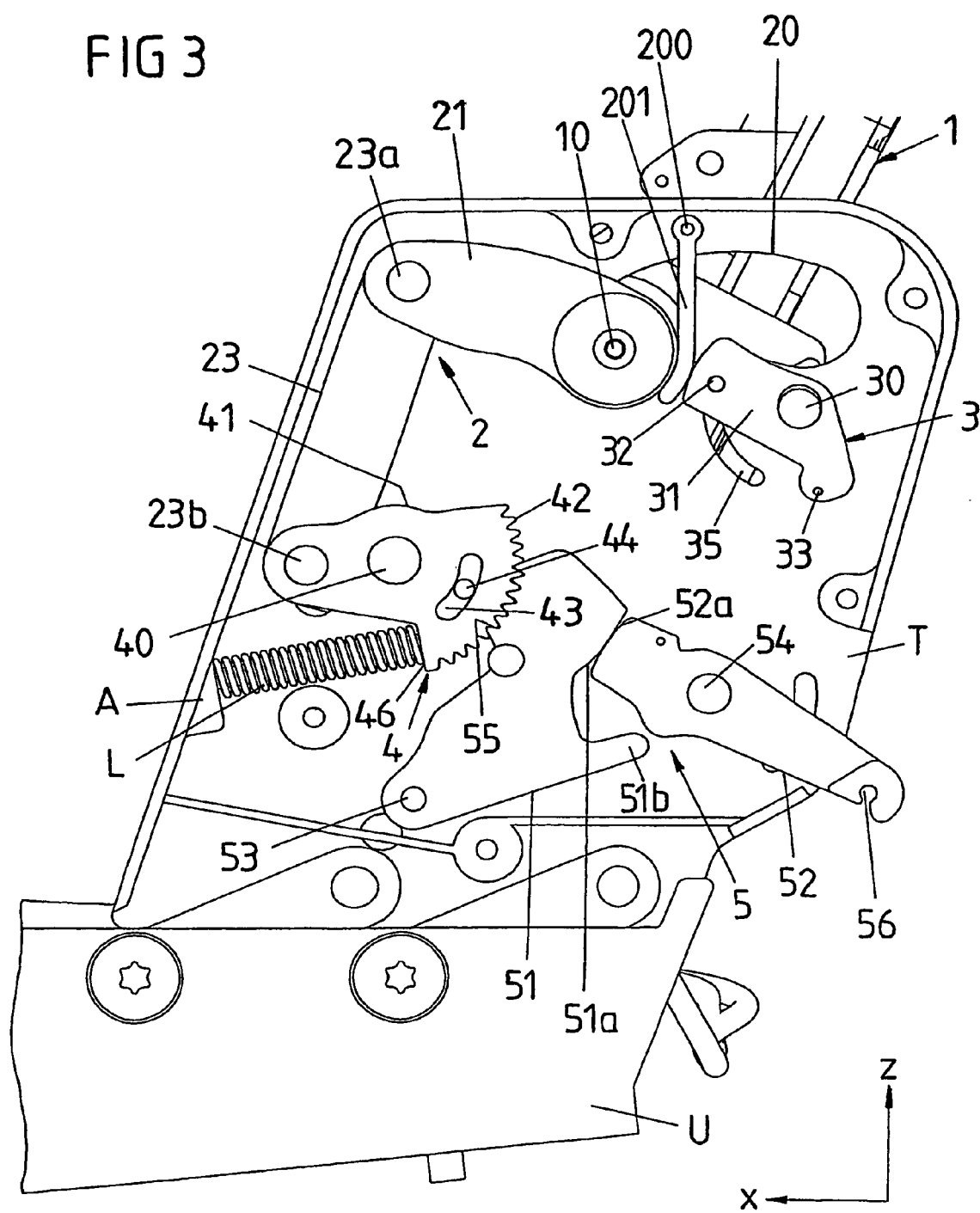
FIG. 3 is a modification of the embodiment of FIG. 2 regarding the means which enable the incline to be adjusted and the backrest to fold forwards about a variable pivotal axis.

FIGS. 2 and 3 show two different embodiments of the means 1 to 5 for enabling the incline adjustment of the backrest R as well as its forward folding action onto the seat surface F, and which are each mounted on the support plate T. FIG. 2 thereby shows an arrangement as can be also seen on the backrest fitment of the vehicle seat in FIGS. 1a and 1b, and FIG. 3 shows a modification of this arrangement. Reference is first made to the arrangement illustrated in FIG. 3.

FIG. 3 shows a backrest fitment 1 which forms a constituent part of the backrest frame of the backrest R of a vehicle seat illustrated in FIGS. 1a and 1b and which has in the region of its lower end along the vertical vehicle axis z a pivotal axis in the form of a bearing pivot 10 through which the backrest fitment 1 is mounted pivotally on a frame assembly T in the form of a support plate of the seat frame. The bearing pivot 10 of the backrest fitment 1 is mounted displaceable in a guiding slide 20 of the support plate T so that the bearing pivot 10 and thus the pivotal axis of the backrest fitment 1 can be moved by sliding along the guiding slide 20 between the two ends of the guiding slide 20.

In the position shown in FIG. 3 such movement of the bearing pivot 10 along the guiding slide 20 is prevented through a lever arm 31 of a locking lever 3 which is pivotally mounted on a bearing point 30 of the support plate T and which acts on the bearing pivot 10 through an intermediate member 201 which pivots about an axis 200 to thereby fix the bearing pivot in the region of the first end in the guiding slide 20. A combined pivotal and sliding movement of the bearing pivot 10 in the guiding slide 20 is hereby impossible.

The locking lever 3 is thereby preferably pretensioned by an elastic element which engages on an engagement point 33 of the locking lever 3 in the direction of the state illustrated in FIG. 3 in which it acts against a displacement of the bearing pivot 10 in the guiding slide 20. The locking lever 3 thereby acts through the intermediate member 201 not directly on the bearing pivot 10 but rather on a lever 21 of a gear assembly 2, 4 on which the bearing pivot 10 is housed. The function of the gear assembly 2, 4 will be explained in further detail below.

In order to release the bearing pivot 10 in the guiding slide 20 it is necessary for the locking lever 3 to pivot so that it no longer acts on the intermediate member 201. With such a pivotal movement the locking lever 3 is guided by a pin 32 in a guiding slide 35 of the support plate T.

The pivotal lever 21 in which the bearing pivot 10 of the backrest fitment 1 is housed is coupled through a coupling lever 23 to a toothed segment lever 41 of the gearing assembly 2, 4 which forms a gear element 4 on which a compression spring L engages. The coupling lever 23 is for this purpose connected for articulated movement at its upper end 23a to the pivotal lever 21 and at its other lower end 23b to the toothed segment lever 41. The toothed segment lever 41 is able to swivel about a bearing point 40 provided on the support plate T and has an external toothing 42 which engages with a locking device 5 so that a pivotal movement of the toothed segment lever 41 is not possible in the state illustrated in FIG. 3.

The toothed segment lever 41 furthermore has a slide 43 in which a pivot 44 provided on the support plate T engages which thus serves to define the possible pivotal region of the toothed segment lever 41.

The locking device 5 assigned to the toothed segment lever 41 comprises a primary locking element 51 which is able to pivot as a locking lever about a bearing point 53 provided on the support plate T and which has a toothed region 55 which engages in the toothed region 42 of the toothed segment lever 41 in order to lock same. The primary locking element 51 is assigned a locking element 52 which is likewise designed as a locking lever and is able to pivot about a further bearing point 54 and which bears with a stop 52a against an associated stop 51a of the primary unlocking element 51 thereby preventing a pivotal movement of the primary locking element 51 which would release the toothing 42 of the toothed segment lever 41.

The secondary locking element 52 is provided with a force engagement point 56 at which a force can be introduced which leads to pivoting of the secondary locking element 52 so that the associated stops 51a, 52a of the two locking elements 51, 52 can be brought out of engagement. To trigger the corresponding pivotal movement of the second locking element 52 it is possible to use different physical or technical principles, for example an actuator in the form of an electromagnet or an electromotor or alternatively a manual actuating device etc.

As the secondary locking element 52 pivots so it acts on a projection 51b of the primary locking element 51 and thereby engenders a pivotal movement of the primary locking element 51 about the associated pivotal axis (bearing point 53) through which its toothing 55 moves out of engagement with associated toothing 42 of the toothed segment lever 41.

Furthermore a linear spring L in the form of a compression spring designed as a coil spring acts on the toothed segment lever 41, the compression spring being supported by one end on a stop A of the support plate T and by the other end on a stop face 46 of the toothed segment lever 41. The compression spring L has the tendency to pivot the toothed segment 41 anti-clockwise which as a result of the coupling of the toothed segment lever 41 through the two further levers 21, 23 of the gear assembly 2, 4 leads to a pivotal movement of the backrest fitment 1 likewise anti-clockwise so that the backrest R (see FIGS. 1a and 1b) has the tendency to incline forwards, thus to bear with its front face V against the back of the seat user. The movement described above of the toothed segment lever 41 as well as of the backrest fitment 1 (and thus of the backrest R) is however prevented in the state of the gear assembly 2, 4 illustrated in FIG. 3, in that the locking device 5 is located in the locked state and therefore prevents a pivotal movement of the toothed segment lever 41.

In order to adjust the incline of the backrest fitment 1 and thus of the backrest R it is first necessary for the locking device 5 to be unlocked through action on the force engagement point 56 of the secondary locking element 52 so that the toothing 55 of the primary locking element 51 moves out of engagement with the associated toothing 42 of the toothed segment lever 41 and thus no longer locks same. The toothed segment lever 41 then pivots under the action of the compression spring L automatically so that it engenders through the two further levers 21, 23 of the gear assembly 2, 4 a pivotal movement of the backrest fitment 1 and thus of the backrest overall forwards, in the direction of the back of a seat user. This pivotal movement is in any case only then possible when the seat user is not leaning with his back against the front face V of the backrest R (see FIGS. 1a and 1b). In the last mentioned case the pivotal movement would be restricted or prevented by the counter force exerted by the seat user on the front face V of the backrest R.

Conversely after the unlocking of the locking device 5 and thus the release of the toothed segment lever 41, pivoting of the backrest R backwards can be triggered by the seat user pressing his back against the front face V of the backrest R in order to incline this backwards. This leads to a pivotal movement of the backrest fitment 1 (together with the backrest R) clockwise and—as a result of the coupling of the toothed segment lever 41 to the backrest fitment 1 through the levers 21, 23—results in a corresponding pivotal movement of the toothed segment lever 41 clockwise. This pivotal movement takes place against the compressive force (pretensioning force) of the compression spring L. That is, the seat user must during action on the front face V of the backrest R overcome that moment which is generated through the action of the compression spring L on the toothed segment lever 41. The gear assembly 41 can thereby in the form of a lever assembly engender a translation of this moment so that the torque exerted by the compression spring L indirectly on the backrest fitment 1 is different from the moment exerted by the compression spring L on the toothed segment lever 41.

In addition in the situation illustrated in FIG. 3 where the backrest fitment 1 and thus the backrest of the seat are locked in a specific inclined position (by the locking device 5) folding the backrest R onto the seat surface F of the motor vehicle seat illustrated in FIGS. 1a and 1b can be triggered by pivoting the locking lever 3 which is coupled to a backrest unlocking button anti-clockwise through actuating the backrest unlocking button so that it no longer acts through the intermediate member 201 through the swivel lever 21 on which the bearing pivot 10 of the backrest fitment 1 is mounted. After unlocking the bearing pivot 10 and thus the pivotal axis of the backrest fitment 1 it is now possible to fold the backrest R together with the backrest fitment 1 forwards towards the seat surface F of the vehicle by the person seizing the backrest R and folding it over towards the seat surface F. With this folding movement of the backrest R and the backrest fitment 1 the bearing pivot 10 which defines the relevant momentary swivel axis of the backrest fitment 1 during the forward folding action, moves in the guiding slide 20 between the two stops at the ends. The movement of the bearing pivot 10 in the guiding slide 20 is thereby controlled by the swivel lever 21 and the coupling lever 23 through which the backrest fitment 1 is coupled to the toothed segment lever 41. Since the toothed segment lever 1 is locked by the associated locking device 5 as the backrest R and backrest fitment 1 are folded forwards, the backrest fitment 1 is coupled on folding forwards via the swivel lever 21 and the coupling lever 23 to an element which is fixed on the frame (not movable relative to the support plate T).

Overall the bearing pivot 10 is moved as the backrest R is folded forwards starting from the position illustrated in FIG. 3 first from the first end of the guiding slide 20 to the other second end and then back again to the first end. When the backrest fitment 41 is folded fully forward and thus the backrest R lies above the seat surface F the bearing pivot 10 is located again at the same spot as at the start of the folding movement (FIG. 3) and can be locked there by the locking lever 3.

On subsequently folding the backrest up again from the position folded forwards onto the seat surface F back into a useful position, corresponding to a substantially upright position with an—as described in detail further below—adjustable incline relative to the vertical vehicle axis z it leads in turn to the previously explained movement of the bearing pivot 10 in the guiding slide 20 of the support plate T.

Here it is of particular importance that neither on folding the backrest forwards nor with subsequently folding the backrest back into a useful position the compression spring L engaging on the toothed segment lever 41 acts on the backrest fitment 1 (and thus the backrest R). For the toothed segment lever 41 is with this folding movement locked by the locking device 5 and acts as an element of the support plate T fixed on the frame. The swivel lever 21 and the coupling lever 23 of the lever assembly 2, 4 are thereby designed so that during folding of the backrest fitment 1 forwards and thus a corresponding swivel movement of the bearing pivot 10 mounted on the swivel lever 21 they just cause the desired to and fro movement of the bearing pivot 10 in the guiding slide 20. The two levers 21, 23 thus compensate the pivotal movement of the backrest R and thus the backrest fitment 1 in play with the guiding slide 20 so that this folding movement can be carried out with a locked toothed segment lever 41.

When folding the backrest R forwards onto the seat surface F as well as when subsequently folding the backrest R back into a useful position in which it can serve to support the back of a vehicle occupant, the backrest R and the backrest fitment 1 are thus uncoupled from the compression spring L insofar as this spring in no way influences the folding movement. This is possible in that the folding movement takes place when the toothed segment lever 41 is locked whereby the bearing pivot 10 in the sliding guide 20 carries out under the control of the swivel lever 21 and the coupling lever 23 the necessary compensating movement (compensation movement) which permits swivelling of the backrest fitment 1 when the toothed segment lever 41 is locked.

FIG. 2 shows a modification of the arrangement of FIG. 3 whereby the difference is that the linear spring L in the form of a compression spring is replaced by a torsion spring D in the form of a spiral spring which engages on one side on the bearing point 40 of the toothed segment lever 41 and on the other side on the cover of the support plate T by a bolt 57.

The torsion spring D has in the arrangement illustrated in FIG. 2 the same function as the linear spring L shown in FIG. 3. It tensions the toothed segment lever 41 in the clockwise direction so that this has the tendency to pivot the backrest fitment 1 and thus the backrest R (see FIGS. 1a and 1b) anticlockwise forwards when the toothed segment lever 41 is not locked by the locking device 5. Pivoting the backrest R backwards therefore has to take place against the pretensioning force of the torsion spring D.

Elsewhere the embodiment illustrated in FIG. 2 coincides with that explained with reference to FIG. 3.

FIG. 4 shows a modification of the motor vehicle seat illustrated in FIGS. 1a and 1b whereby a difference exists in that here the structural assemblies serving for the incline adjustment of the backrest R and folding the backrest R forwards onto the seat surface F are mounted not directly on the support plate T of the seat underframe U but on a base plate 100 mounted pivotally on the support plate T as will be explained in further detail below with reference to FIG. 5a.

Figure 5A:
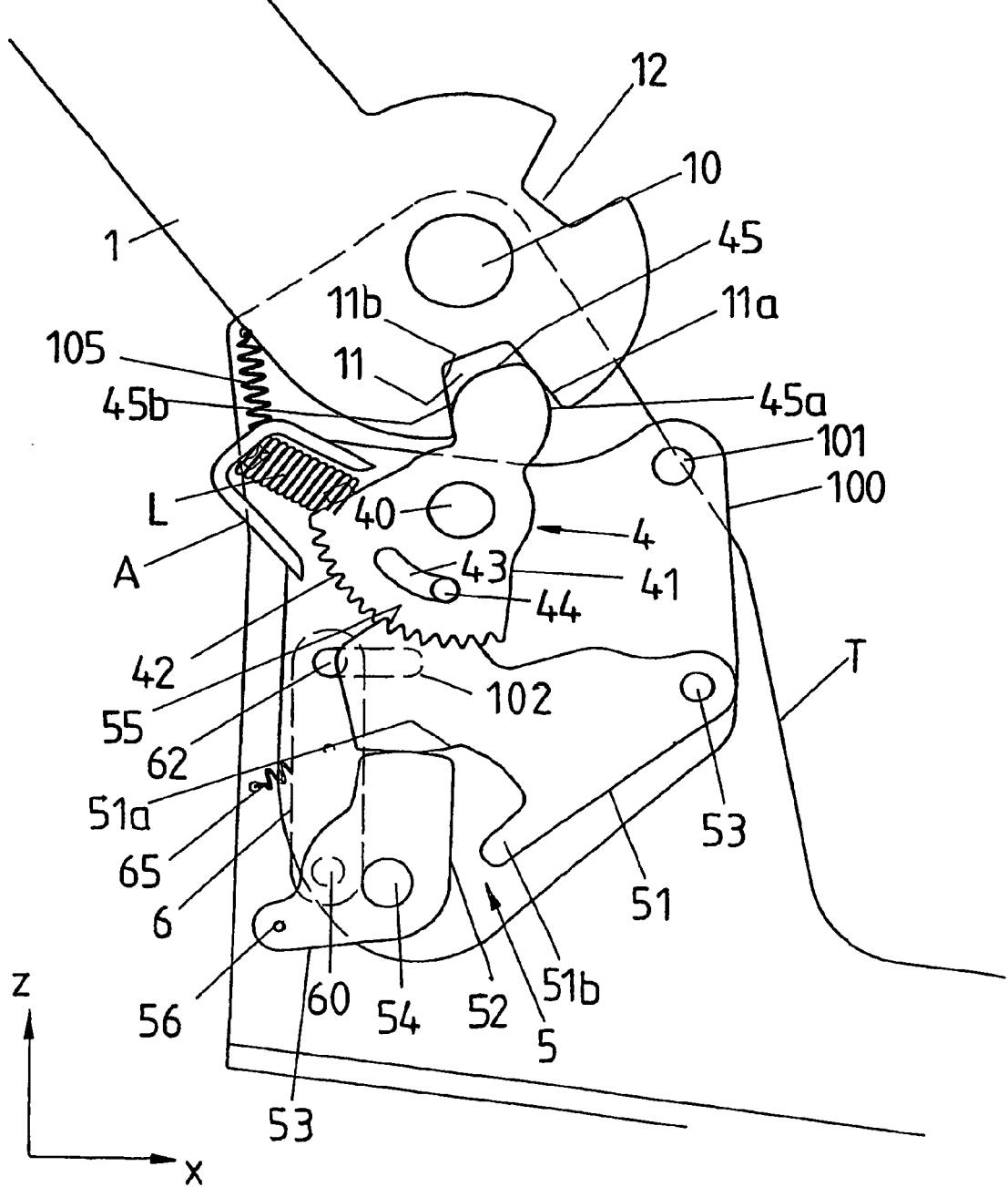
FIG. 5a is a first detailed view of the motor vehicle seat of FIG. 4 in the region of the connection between the backrest and the seat underframe to show the means to adjust the incline as well as to fold the backrest forwards with three different settings of the inclination.

An important difference in the arrangement illustrated in FIG. 5a compared with the arrangements illustrated in FIGS. 2 and 3 is that the bearing pivot 10 and thus the pivotal axis of the backrest 1 are not mounted longitudinally movable in a guiding slide but rather on a defined bearing point of the support plate T so that the backrest fitment 1 can be pivoted by the bearing pivot 10 about a locally fixed swivel axis, but the swivel axis is not spatially variable.

A further important difference lies in the fact that the toothed segment lever 41 on which acts a linear spring L in the form of a compression spring designed as a coil spring supported on the stop A of the base plate 100, is not mounted on the support plate T but for swivel movement about a bearing point 40 on a base plate 100 which in turn is mounted on the support plate T to swivel about a bearing point 101. The primary locking element 51 and the secondary locking element 52 of the locking device 5 which interacts with the toothed segment lever 41 in the manner described with reference to FIG. 3 are also mounted on the said support plate.

The toothed segment lever 41 is furthermore here not coupled through lever elements of a gearing assembly but rather directly to the backrest fitment 1 of the backrest R (see FIG. 4) in that the toothed segment lever 41 engages by an involute type lever section 45 in an associated recess 11 of the backrest fitment 1.

The engagement of the involute type surface 45a, 45b of the said lever section 45 into the associated recess 11 of the backrest fitment 1 is ensured in that the base plate 100 is elastically pretensioned by a spring element 105 in the form of a tension spring fixed by one end to the support plate T and by the other end to the base plate 100, into a pivotal position in which the toothed segment lever 41 is located directly beneath the lower end of the backrest fitment 1 and can thus engage with the lever section 45 for this purpose in the associated recess 11 of the backrest fitment 1. The base plate 100 is thereby fixed by a locking lever 6 attached for pivotal movement on a bearing point 60 of the support plate R, in the position in which the involute type section 45 of the toothed segment lever 41 can engage in the associated recess 11 of the backrest fitment 1. The locking lever 6 is for this purpose guided with a guide element 62 in a guide of the base plate 100 in the form of an oblong hole 102 and is elastically pretensioned by a spring element 65 so that the guide element 62 bears against one end of the oblong hole 102 and hereby prevents a pivotal movement of the base plate 100 about its bearing point 101 which would bring the involute type lever section 45 out of engagement with the associated recess 101 of the backrest fitment 1.

It can furthermore be seen from FIG. 5a that the involute type lever section 45 is supported with each one surface area 45a, 45b on each one of two opposing defining walls 11a, 11b of the associated recess 11 of the backrest fitment 1. The backrest fitment 1 is hereby locked in the incline position illustrated in FIG. 5a in which the backrest fitment 1 and thus the backrest R are inclined slightly back relative to the vertical vehicle axis z (in relation to the state installed in a motor vehicle). An adjustment of the incline of the backrest fitment 1 (and thus the backrest R) from this position is impossible so long as the toothed segment lever 41 is locked in a defined position by the locking device 5.

To change the incline of the backrest fitment 1 it is therefore necessary first to release the locking device 5 in the manner described with reference to FIGS. 2 and 3 so that the toothing 55 of the primary locking element 51 moves out of engagement with the associated toothing 42 of the toothed segment lever 41. The toothed segment lever 41 has the tendency under the action of the compression spring L (heavily compressed when the backrest is inclined backwards according to FIG. 5a) to execute a pivotal movement (anti clockwise) whereby it acts with the surface 45a, 45b of the involute type section 45 on the opposing wall sections 11a, 11b of the associated recess 11 and triggers a swivel movement of the backrest fitment 1 (clockwise) which leads to an adjustment in the incline of the backrest fitment 1 (and thus of the backrest R) forwards towards the back of the seat user.

Figure 5B:
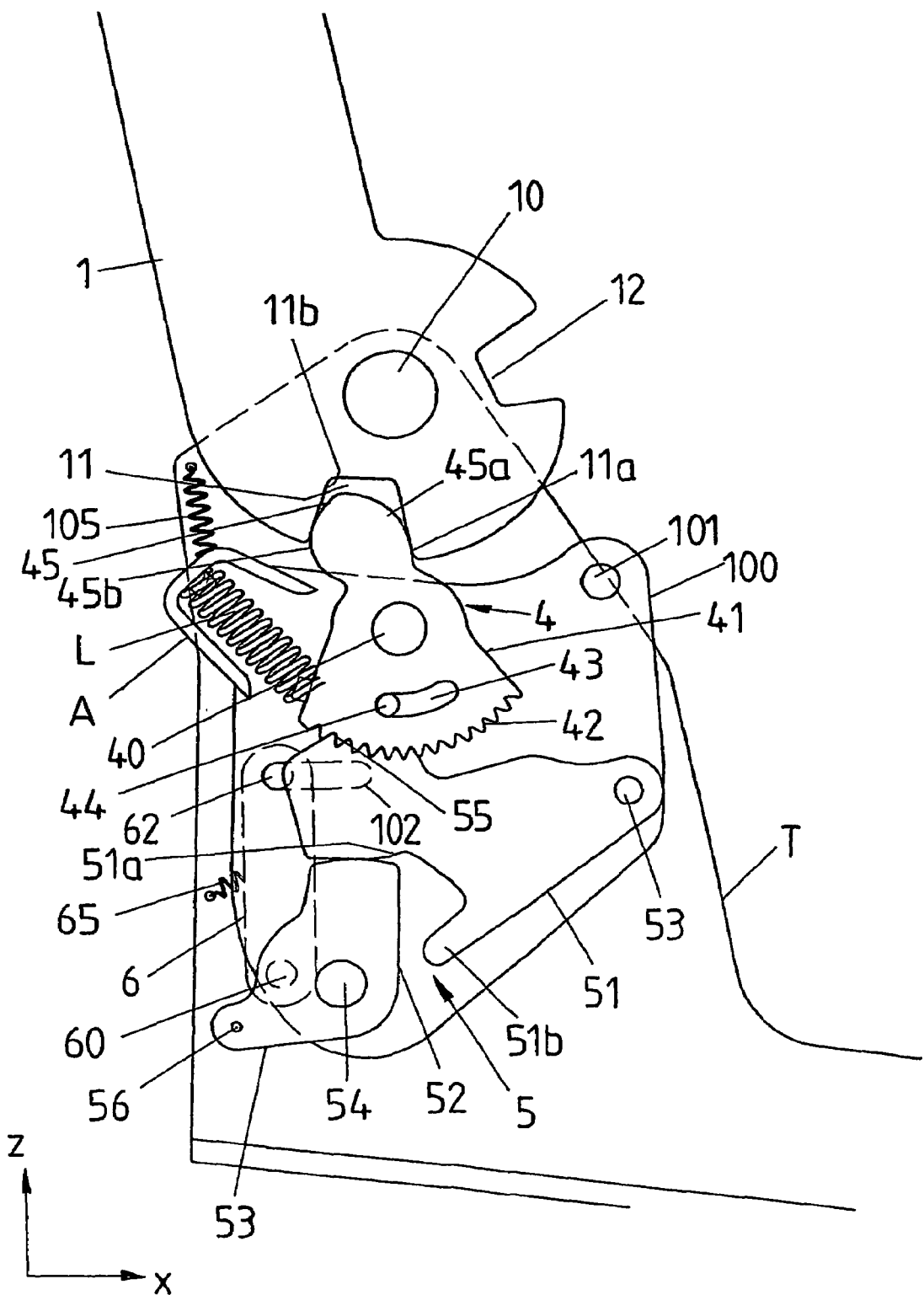
FIG. 5b is a second detailed view of the motor vehicle seat of FIG. 4 in the region of the connection between the backrest and the seat underframe to show the means to adjust the incline as well as to fold the backrest forwards with three different settings of the inclination.

FIG. 5b shows the backrest fitment 1 with the maximum relaxed compression spring L through which the toothed segment lever 41 has been pivoted maximum anti-clockwise whereby the maximum swivel movement of the toothed segment lever 41 is determined through the interaction of its slide 43 with the pivot 44 provided on the base plate 100. In the corresponding useful position of the backrest fitment 1 and thus backrest R pivoted forwards to the maximum extent these extend substantially perpendicular along the vertical vehicle axis. Also in this inclined position the backrest fitment 1 and backrest R are locked through the interaction of the surface 45a, 45b of the involute type lever section 45 with the side walls 11a, 11b of the associated recess 11 whereby the toothed segment lever 41 is locked through the locking device 5. (This locking of the toothed segment lever 41 was obviously lifted during the pivotal movement which has led from the incline angle of the backrest fitment 1 shown in FIG. 5a to the incline angle shown in FIG. 5b, as described above).

Figure 5C:
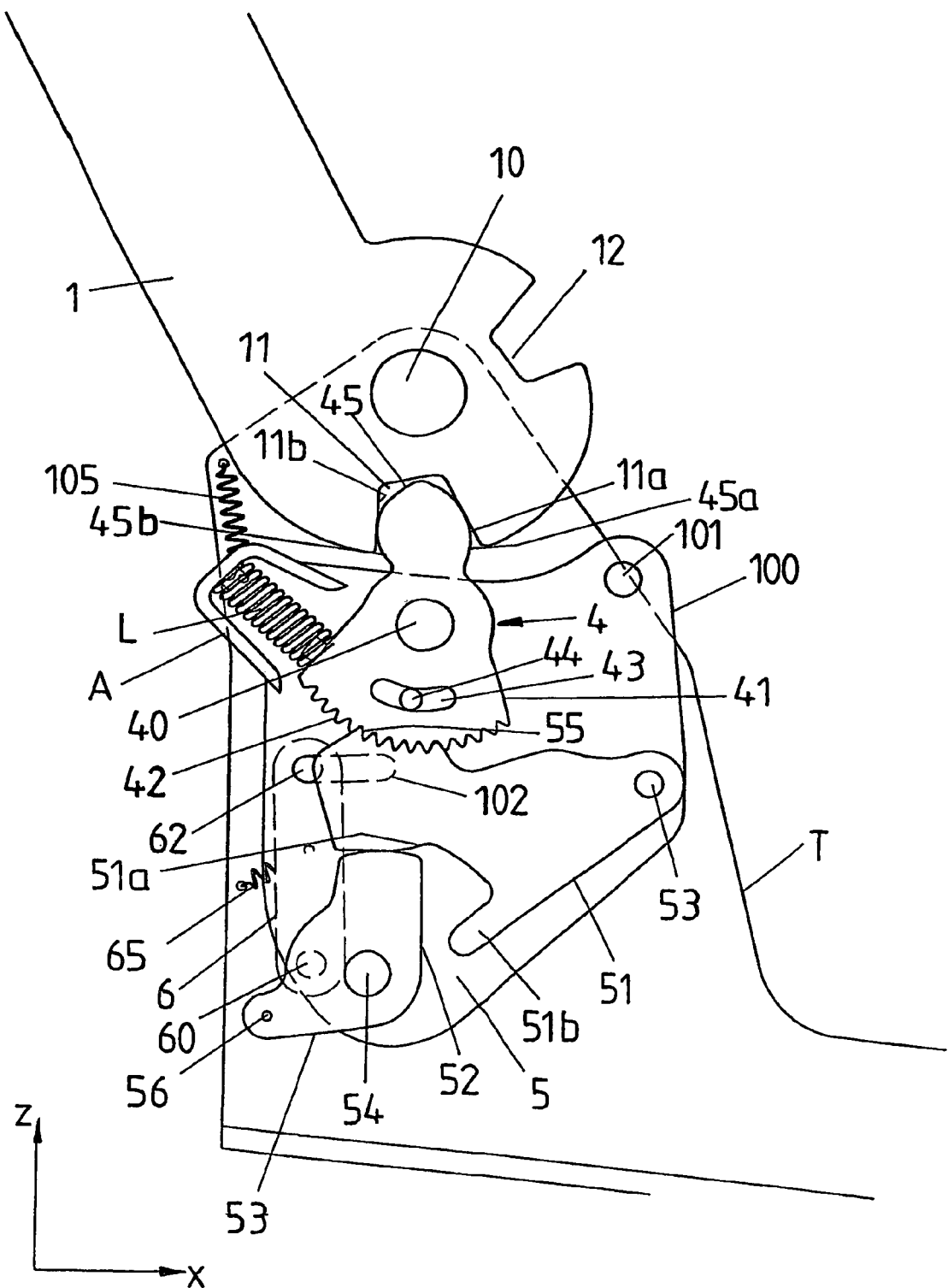
FIG. 5c is a third detailed view of the motor vehicle seat of FIG. 4 in the region of the connection between the backrest and the seat underframe to show the means to adjust the incline as well as to fold the backrest forwards with three different settings of the inclination.

FIG. 5c shows finally the backrest fitment R in the middle incline position with an alignment inclined slightly back relative to the vertical vehicle axis z. This is a middle incline setting compared with the maximum rearwardly inclined backrest fitment according to FIG. 5a and the backrest fitment 1 mounted substantially vertical according to FIG. 5b.

The middle incline position of the backrest fitment 1 and backrest R illustrated in FIG. 5c is thereby occupied in that the seat user after unlocking the locking device 5 does not allow a complete pivotal movement of the backrest fitment 1 into its most forward inclined position shown in FIG. 5b (with substantially perpendicular alignment), but presses with his back against the front face V of the backrest R and thereby restricts the pivotal movement of the backrest R (and backrest fitment 1) forwards. When the backrest R is in an inclined position which is acceptable to the seat user this is then locked by the seat user again locking with a suitable actuating element e.g., in the form of an operating lever, the locking device 5 in known way so that the toothed segment lever 41 is locked in the position then existing and thus also fixes the backrest fitment 1 and the backrest R in the actual inclined position.

With the adjustment of the backrest incline explained with reference to FIGS. 5a to 5c the compression spring L acts on the backrest fitment 1 and thus the backrest R each time only indirectly through the gearing element 4 designed as a toothed segment lever 41 which in turn is connected to the backrest fitment 1 through the involute type lever section 45 and the associated recess 11. This opens up the possibility when folding the backrest R forwards towards the seat surface F of completely ruling out any influence of the compression spring L, as will be explained below with reference to FIGS. 6a to 6c.

For this the unlocking lever which is provided in known way on the backrest for folding the backrest forwards onto the seat surface is connected e.g. through a Bowden cable to the locking lever 6 of the base plate 100 for which a corresponding force engagement point 63 is provided on the locking lever 6. The actuation of the unlocking lever of the backrest has the result that the locking lever 6 is pivoted about its bearing point 60 (clockwise) whereby the guide element 62 provided on the locking lever 60 moves along the rectilinear oblong hole 102 provided in the base plate 100 and hereby triggers a pivotal movement of the base plate 100 anticlockwise, as explained in FIG. 6a. The pivotal movements of the locking lever 6 and the base plate 100 thereby take place each time against the pretensioning force of the associated spring element 65, 105 acting as a resetting spring.

Figure 6A:
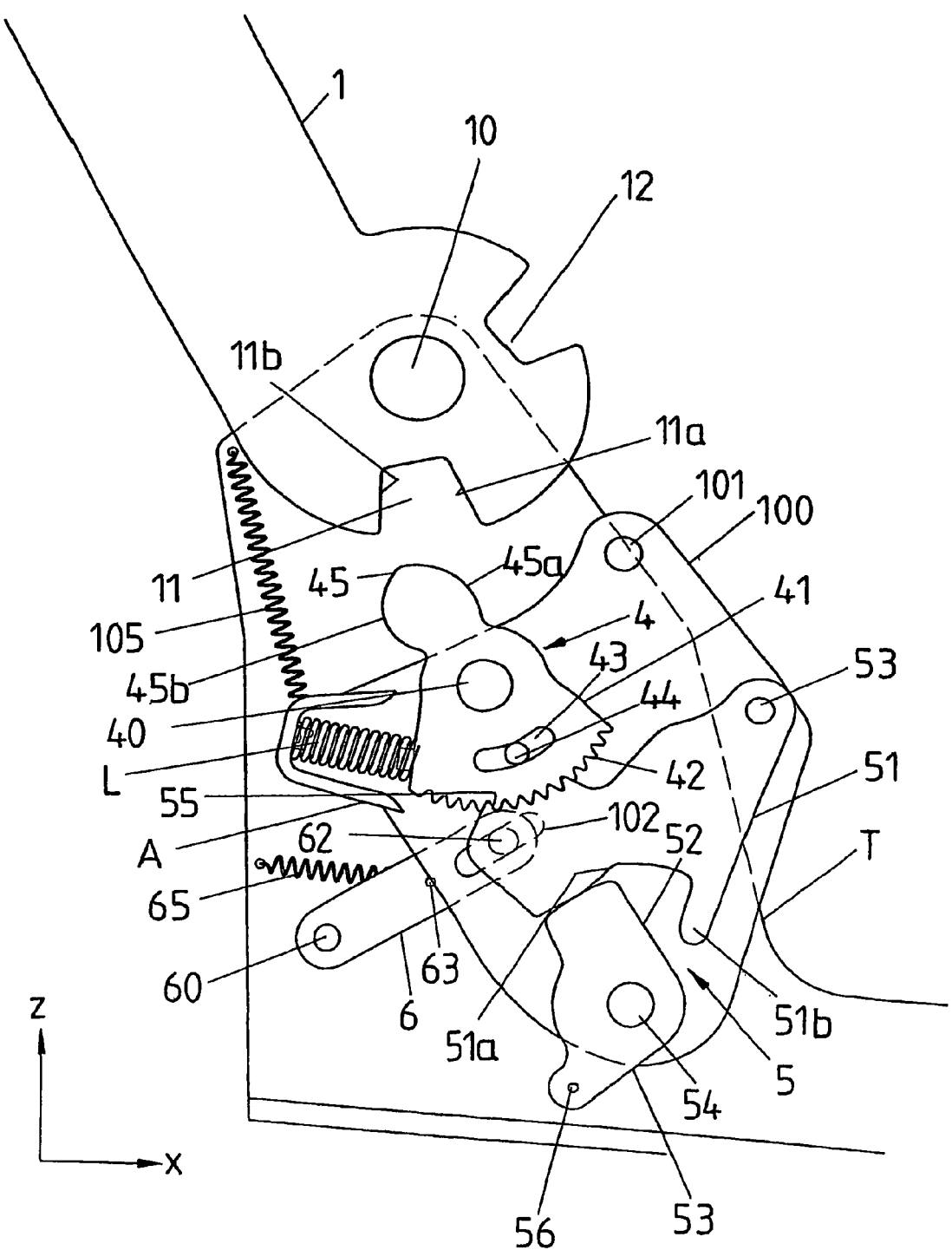
FIG. 6a is a first detailed view according to FIG. 5a to 5c as the backrest is folded forwards onto the seat surface.
Figure 6B:
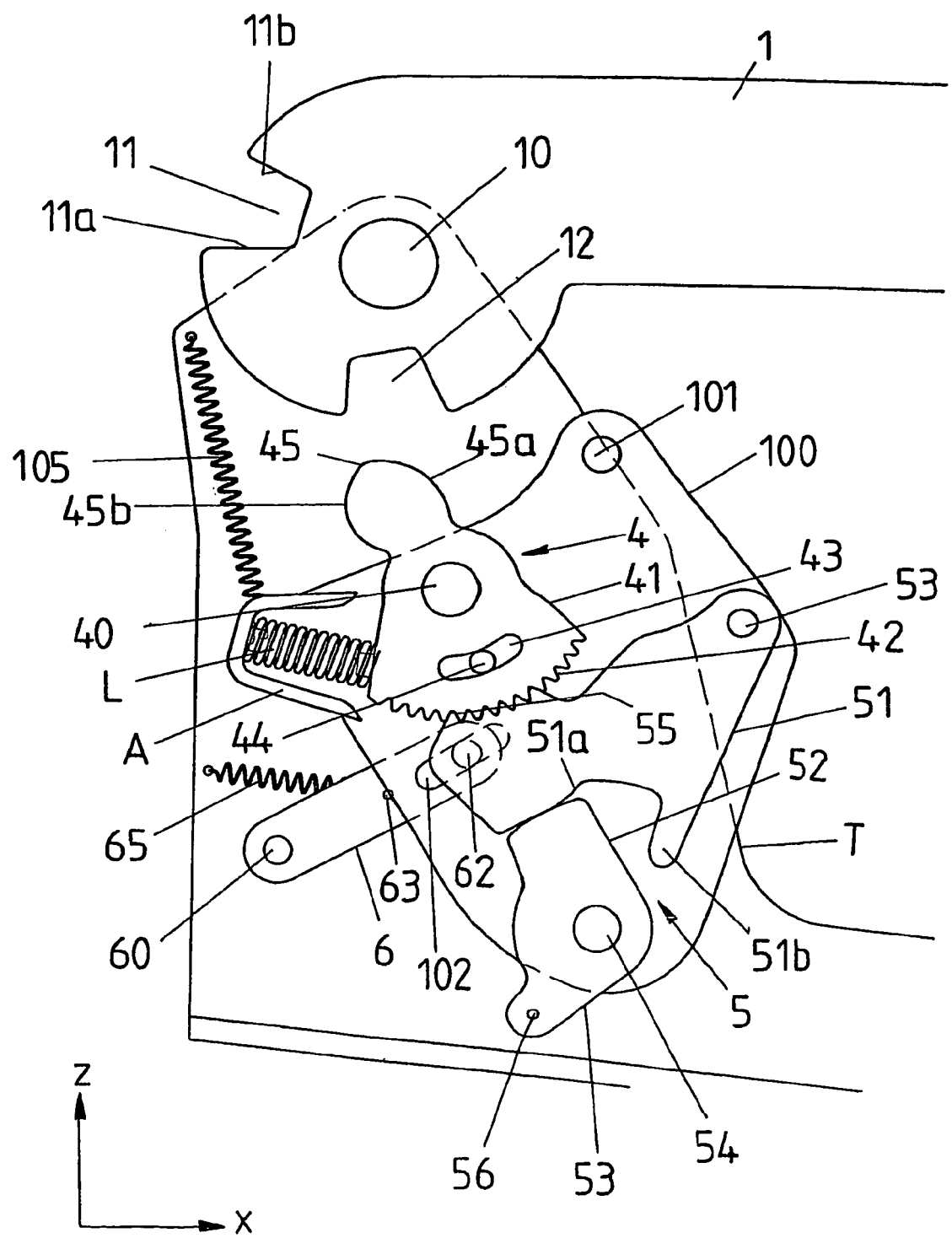
FIG. 6b is a second detailed view according to FIG. 5a to 5c as the backrest is folded forwards onto the seat surface.
Figure 6C:
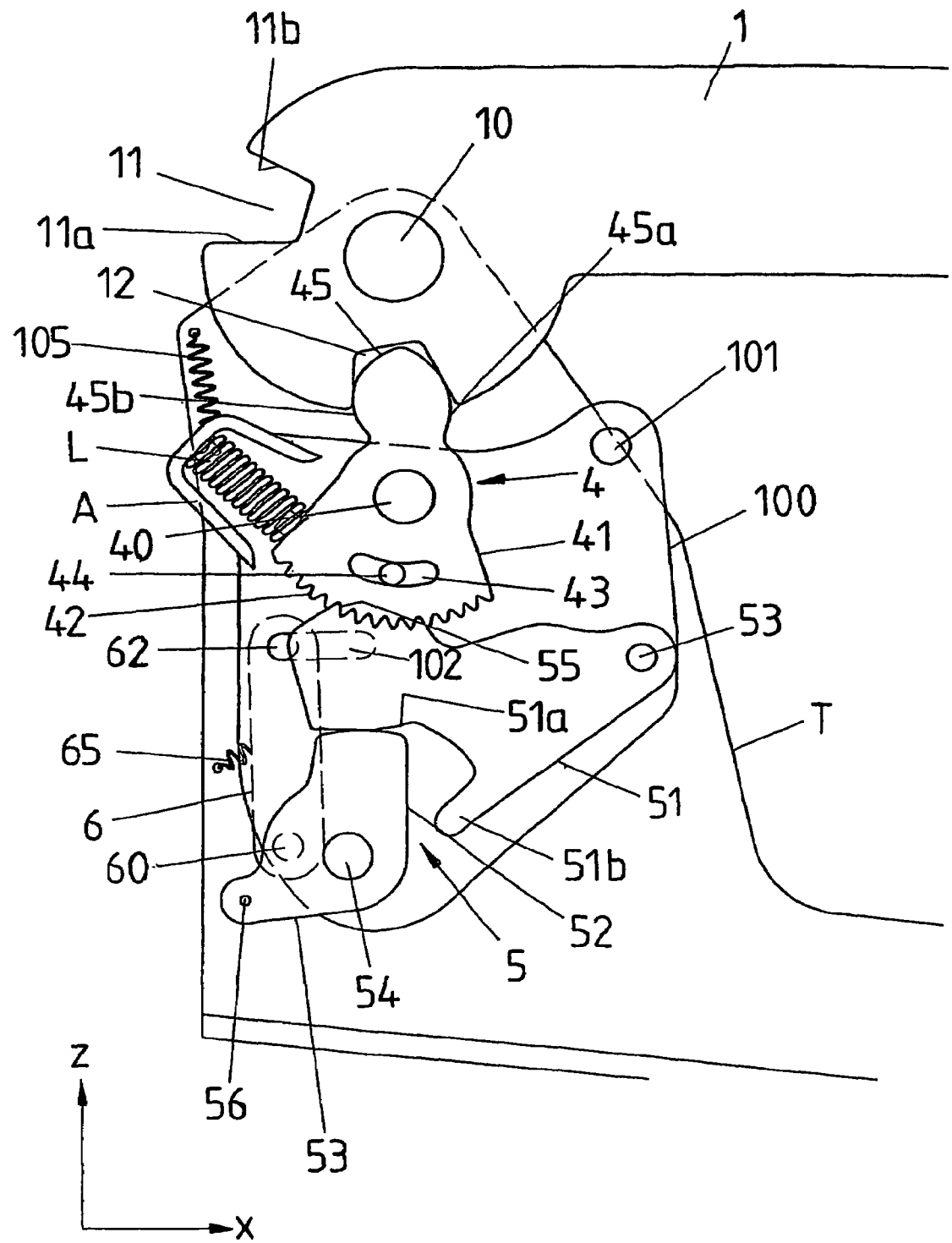
FIG. 6c is a third detailed view according to FIG. 5a to 5c as the backrest is folded forwards onto the seat surface.

As can be seen from FIG. 6a, by swivelling the base plate 100 the toothed segment lever 41 is removed from the lower end of the backrest fitment 1 so that its involute type lever section 45 moves out of engagement with the associated recess 11 of the backrest fitment 1. The backrest fitment 1 is hereby uncoupled from the toothed segment lever 41 and from the compression spring L associated with the toothed segment lever 41. In this state the backrest R can be folded together with the backrest fitment 1 forwards in the direction of the seat face F of the corresponding vehicle seat (see FIG. 4), as shown in FIG. 6b. If when the backrest and backrest fitment 1 are folded forwards the actuation of the locking lever 6 is lifted through the corresponding unlocking lever of the backrest R then under the action of the spring elements 65, 105 acting as resetting springs the locking lever 6 and the base plate 100 are returned to their starting position in which the toothed segment lever 41 is mounted directly underneath the lower end of the backrest fitment 1. The involute type lever section 45 thereby engages in a further recess 12 of the backrest fitment 1 so that the backrest fitment 1 and thus the backrest R are locked in their forward folded position as shown in FIG. 6c.

To fold the backrest R back from the forward folded position into a substantially upright useful position which may possibly be inclined backwards relative to the vertical, it is then possibly first necessary to actuate the locking lever 6 again in order to trigger a pivotal movement of the base plate 100 through which the backrest fitment 1 is released.

With the embodiments illustrated in FIGS. 6a to 6c the backrest fitment 1 when the backrest R is folded forwards onto the seat surface F as well as with subsequently folding the backrest R back into a useful position is thus brought completely out of engagement with the toothed segment lever 41 in order to ensure that the compression spring L acting on the toothed segment lever 41 does not affect folding round the backrest R. This is contrary to the embodiment illustrated with reference to FIGS. 2 and 3 in which the toothed segment lever 41 is further connected to the backrest fitment 1 through the lever elements 21, 23 even when folding the backrest R round, but at the same time is uncoupled from these by the longitudinal guide 20 associated with the lever elements 21, 23 so that folding the backrest R round can take place independently of a movement of the toothed segment lever 41, as has been explained above with reference to FIGS. 2 and 3.

The incline adjustment of the backrest R after folding back into the useful position corresponds exactly to the incline adjustment before folding round onto the seat surface F.

Figure 7:
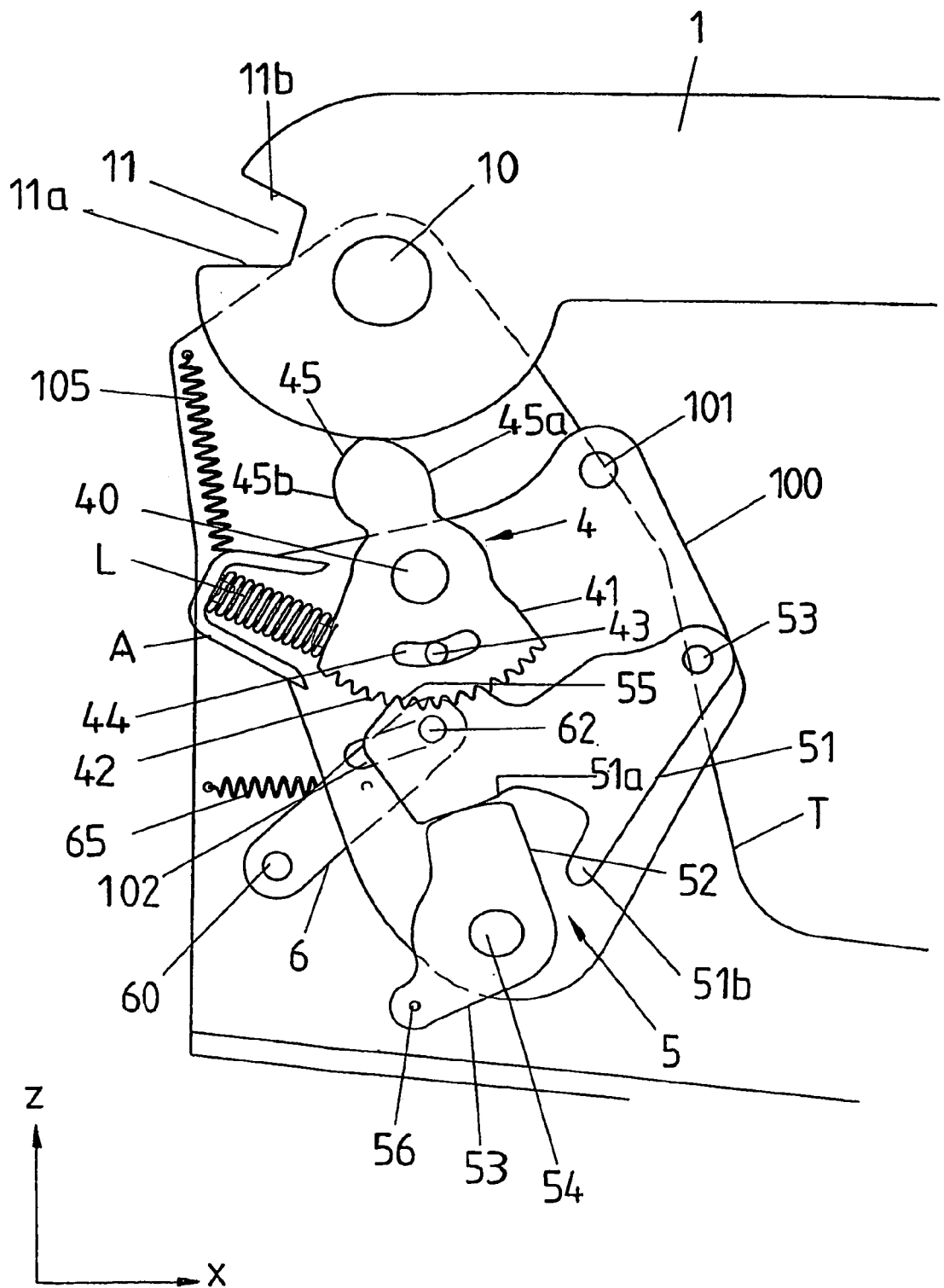
FIG. 7 is a modification of the mechanism of FIGS. 6a to 6c whereby the backrest is not lockable in its forward folded position.

FIG. 7 shows a modification of the arrangement of FIGS. 5a to 5c and 6a to 6c whereby the difference is that the backrest fitment 1 has no second recess 12 in which the toothed segment lever 41 can engage with its lever section 45 with involute type surface 45a, 45b. The backrest R is then not locked in its position folded forwards onto the seat surface F (and can thus occupy any desired position).

Figure 8:
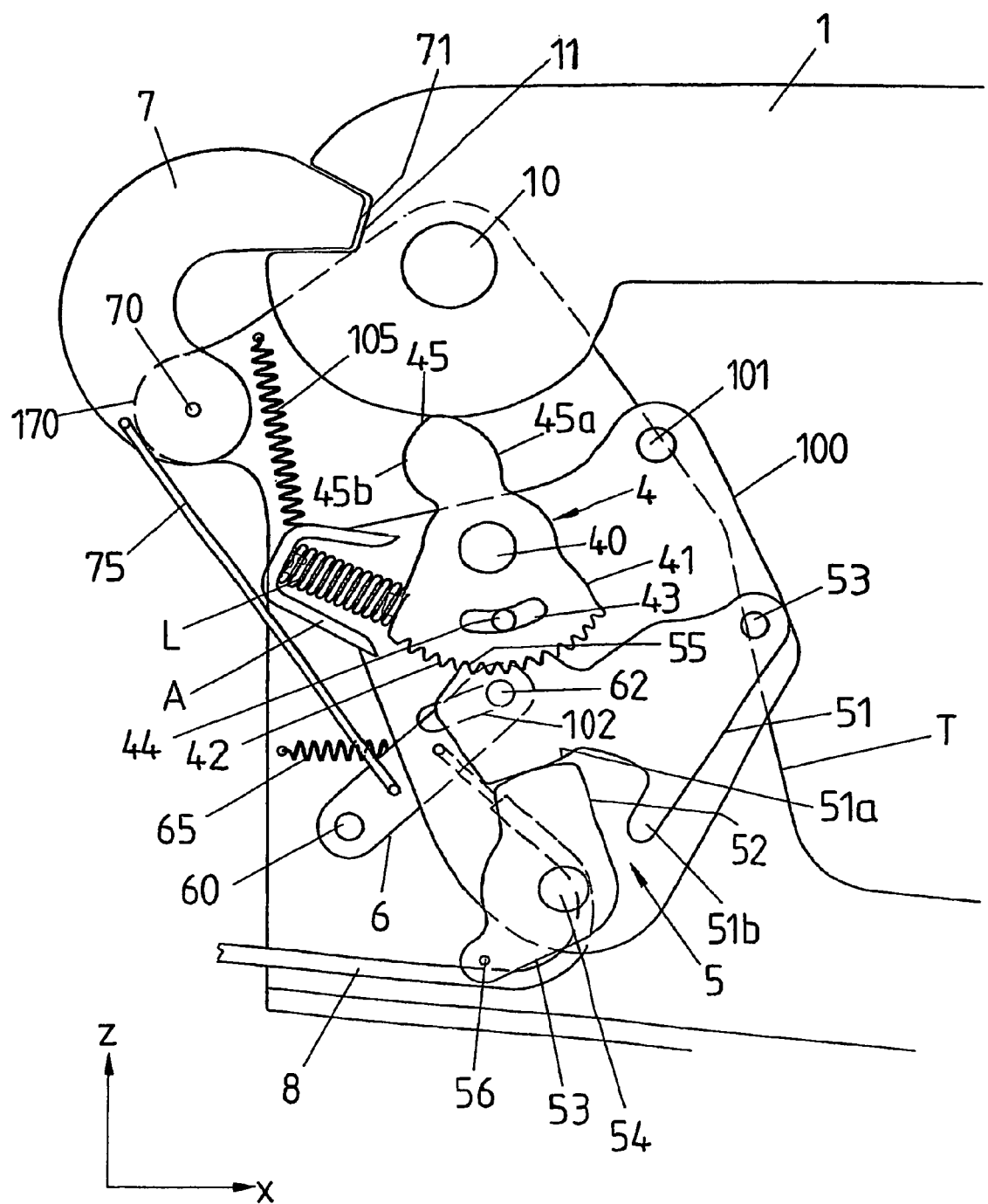
FIG. 8 is a second modification of the mechanism of FIGS. 6a to 6c whereby a separate locking mechanism is provided for the forward folded backrest.

FIG. 8 shows a further modification of the arrangement of FIGS. 6a to 6b whereby the difference is that a separate locking element 7 is provided for locking the backrest fitment 1 in the forward folded position of the backrest R. This locking element 7 is designed as a locking lever and is mounted on a projection 170 of the base plate 100 to pivot about a bearing point 70. It is coupled with a coupling element 75 in the form of a coupling rod to the locking lever 6 so that as the locking lever 6 swivels which corresponds to folding the backrest R and backrest fitment 1 forwards the locking lever 7 is pivoted about its bearing point 70 so that it engages with its front end section 71 into an associated recess 11 of the backrest fitment 1. This can be the same recess 11 which when the backrest R is in the useful position, substantially upright or slightly inclined backwards, is associated with the toothed segment lever 41.

The advantage of the assembly illustrated in FIG. 8 is that the backrest R and the backrest fitment 1 in the forward folded position are always locked by the locking lever 7 in the same substantially horizontal position. On the other hand with the arrangement illustrated in FIGS. 6a to 6c the exact position of the forward folded backrest R depends on the angular position of the toothed segment lever 41 locked by the locking device 5, which to lock the backrest R in the forward folded position with a lever section 45 engages into an associated recess 12 of the backrest fitment 1.

FIG. 8 furthermore shows a Bowden cable 8 which extends from the locking lever 6 to an unlocking device for the seat longitudinal adjustment of the corresponding vehicle seat. This Bowden cable is actuated during pivoting of the locking lever 6 in connection with forward folding of the backrest R onto the seat surface F and leads to an unlocking of the seat longitudinal adjustment of the motor vehicle seat so that this can be moved in the seat longitudinal direction to implement a so-called easy-entry function.

The invention claimed is:

1. A motor vehicle seat comprising:
a pivotally mounted backrest which can be adjusted in its inclination and which has a front face serving to support a back of a user of the seat, and
a spring assembly with at least one elastic element with which the backrest is elastically pretensioned to bias the backrest forwards such that the backrest bears with its front face against the back of a user of the seat;
whereby the inclination of the backrest can be adjusted by exerting a force on the front face of the backrest against a force of the spring assembly;
wherein the spring assembly engages on a gear element which is coupled to the backrest and which is associated with a locking device with which the gear element can be locked in different positions;
wherein the gear element is assigned a clutch by which the backrest can be uncoupled from the gear element so that the backrest can be folded forwards towards the seat surface of the motor vehicle seat without the gear element being moved;
wherein the gear element can be brought out of engagement with the backrest so that the gear element is not in connection with the backrest; and
wherein the gear element is mounted on a base plate which is movable so that the gear element moves out of engagement with the backrest.

2. The motor vehicle seat according to claim 1, wherein the backrest is locked in an inclined position in a locked state of the locking device.

3. The motor vehicle seat according to claim 2, wherein the inclination of the backrest is adjustable in an unlocked state of the locking device.

4. The motor vehicle seat according to claim 1 wherein the inclination of the backrest is adjustable in an unlocked state of the locking device.

5. The motor vehicle seat according to claim 4, wherein the backrest is pivotable forwards under a force of the spring assembly on the gear element.

6. The motor vehicle seat according to claim 5, wherein the backrest is pivotable backwards by a compression force on the front face against a force of the spring assembly.

7. The motor vehicle seat according to claim 4 wherein the backrest is pivotable backwards by a compression force on the front face against a force of the spring assembly.

8. The motor vehicle seat according to claim 1, wherein the gear element is a constituent part of a gear assembly, through which the spring assembly is coupled to the backrest.

9. The motor vehicle seat according to claim 8, wherein the gear assembly is configured to translate a torque exerted by the spring assembly on the gear element.

10. The motor vehicle seat according to claim 8, wherein the gear element is a constituent part of a lever assembly through which the spring assembly is coupled to the backrest.

11. The motor vehicle seat according to claim 1, wherein during uncoupling from the gear element, the backrest is uncoupled from the spring assembly to prevent the spring assembly from exerting a force on the backrest.

12. The motor vehicle seat according to claim 1, wherein the backrest can be uncoupled from the gear element by the clutch so that the backrest can be folded forwards towards the seat surface when the gear element is locked by the locking device.

13. The motor vehicle seat according to claim 1, wherein to uncouple the backrest from the gear element as the backrest is folded forwards, a pivotal axis of the backrest is moved along a predetermined path so that a reaction of the pivotal movement of the backrest on the gear element is prevented.

14. The motor vehicle seat according to claim 13, wherein the path is formed by a guide device in which the pivotal axis is guided to move left.

15. The motor vehicle seat according to claim 1, wherein the base plate is pretensioned by a spring element into one position.

16. The motor vehicle seat according to claim 15, wherein the base plate includes a locking lever by which the base plate is lockable in a position in which the gear element engages with the backrest.

17. The motor vehicle seat according to claim 1, wherein the base plate is assigned a locking lever by which the base plate can be locked in a position in which the gear element engages with the backrest.

18. The motor vehicle seat according to claim 17, wherein the base plate can be brought by actuation of the locking lever into a position in which the gear element is out of engagement with the backrest.

19. The motor vehicle seat according to claim 1, wherein locking means are provided by which the clutch can be locked in a state in which the gear element is coupled to the backrest.

20. The motor vehicle seat according to claim 1, wherein locking means are provided by which the clutch can be locked in a state in which the gear element is uncoupled from the backrest.

21. The motor vehicle seat according to claim 1 wherein locking means are provided by which the clutch can be locked in a state in which the gear element is coupled to the backrest, and wherein the locking means engage on the base plate in order to prevent the movement thereof.

22. The motor vehicle seat according to claim 21, wherein the locking means comprises a lever guided in an oblong hole of the base plate and pretensioned elastically towards the locked state.

23. The motor vehicle seat according to claim 1, wherein the locking device of the gear element has a primary locking element and a secondary locking element whereby the primary locking element in a locked state engages the gear element and the secondary locking element blocks the primary locking element in the locked state.

24. The motor vehicle seat according to claim 1, wherein the gear element comprises a toothed segment lever.

25. The motor vehicle seat according to claim 1, wherein the spring assembly has a spring element which engages the gear element.

26. The motor vehicle seat according to claim 1, wherein the gear element can be brought into engagement with the locking device through toothed gearing.

27. The motor vehicle seat according to claim 1, wherein locking means are provided by which the clutch can be locked in a state in which the gear element is uncoupled from the backrest, and wherein the locking means engage on the base plate in order to prevent the movement thereof.

28. The motor vehicle seat according to claim 1, wherein the gear element is pivotally mounted on the base plate.

29. A motor vehicle seat comprising:
a pivotally mounted backrest which can be adjusted in its inclination and which has a front face serving to support a back of a user of the seat, and
a spring assembly with at least one elastic element with which the backrest is elastically pretensioned to bias the backrest forwards such that the backrest bears with its front face against the back of a user of the seat;
whereby the inclination of the backrest can be adjusted by exerting a force on the front face of the backrest against a force of the spring assembly;
wherein the spring assembly engages on a gear element which is coupled to the backrest and which is associated with a locking device with which the gear element can be locked in different positions;
wherein to uncouple the backrest from the gear element as the backrest is folded forwards, a pivotal axis of the backrest is moved along a predetermined path so that a reaction of the pivotal movement of the backrest on the gear element is prevented; and
wherein locking means are provided by which a clutch can be locked in a state in which the gear element is coupled to the backrest, and wherein the locking means engage on the pivotal axis of the backrest and prevent its movement along the path.

30. The motor vehicle seat according to claim 29, wherein the locking means comprises a lever.

31. A motor vehicle seat comprising:
a pivotally mounted backrest which can be adjusted in its inclination and which has a front face serving to support a back of a user of the seat, and
a spring assembly with at least one elastic element with which the backrest is elastically pretensioned to bias the backrest forwards such that the backrest bears with its front face against the back of a user of the seat;
whereby the inclination of the backrest can be adjusted by exerting a force on the front face of the backrest against a force of the spring assembly;
wherein the spring assembly engages on a gear element which is coupled to the backrest and which is associated with a locking device with which the gear element can be locked in different positions;
wherein to uncouple the backrest from the gear element as the backrest is folded forwards a pivotal axis of the backrest is moved along a predetermined path so that a reaction of the pivotal movement of the backrest on the gear element is prevented; and
wherein locking means are provided by which a clutch can be locked in a state in which the gear element is uncoupled from the backrest, and wherein the locking means engage on the pivotal axis of the backrest and prevent its movement along the path.

32. The motor vehicle seat according to claim 31, wherein the path is formed by a guide device in which the pivotal axis is guided to move left.

33. A motor vehicle seat comprising:
a pivotally mounted backrest which can be adjusted in its inclination and which has a front face serving to support a back of a user of the seat, and
a spring assembly with at least one elastic element with which the backrest is elastically pretensioned to bias the backrest forwards such that the backrest bears with its front face against the back of a user of the seat;
whereby the inclination of the backrest can be adjusted by exerting a force on the front face of the backrest against a force of the spring assembly;
wherein the spring assembly engages on a gear element which is coupled to the backrest and which is associated with a locking device with which the gear element can be locked in different positions;

wherein to uncouple the backrest from the gear element as the backrest is folded forwards a pivotal axis of the backrest is moved along a predetermined path so that a reaction of the pivotal movement of the backrest on the gear element is prevented;

wherein the path is formed by a guide device in which the pivotal axis is guided to move left; and wherein locking means are provided by which a clutch can be locked in a state in which the gear element is coupled to the backrest, and wherein the locking means engage on the pivotal axis of the backrest and prevent its movement along the path.

34. The motor vehicle seat according to claim 33, wherein the clutch can be locked in a state in which the gear element is uncoupled from the backrest, and wherein the locking means engage on the pivotal axis of the backrest and prevent its movement along the path.

* * * * *